Feb. 6, 1968   L. V. PREDDY, JR   3,367,677
ALIGNING DEVICE FOR TANDEM VEHICLE AXLES
Filed June 13, 1966   6 Sheets-Sheet 1

INVENTOR
L. V. Preddy, Jr.

BY  *Cecil L. Woods*

ATTORNEY

Feb. 6, 1968 L. V. PREDDY, JR 3,367,677
ALIGNING DEVICE FOR TANDEM VEHICLE AXLES
Filed June 13, 1966 6 Sheets-Sheet 3

INVENTOR
L.V. Preddy, Jr

BY Cecil L. Wood

ATTORNEY

INVENTOR
L. V. Preddy, Jr.

ATTORNEY

Feb. 6, 1968 L. V. PREDDY, JR 3,367,677
ALIGNING DEVICE FOR TANDEM VEHICLE AXLES
Filed June 13, 1966 6 Sheets-Sheet 6

INVENTOR
L. V. Preddy, Jr.

BY

ATTORNEY

United States Patent Office 3,367,677
Patented Feb. 6, 1968

3,367,677
ALIGNING DEVICE FOR TANDEM VEHICLE
AXLES
L. V. Preddy, Jr., Dallas, Tex., assignor to Dye Trucking
Company, Dallas, Tex., a corporation of Texas
Filed June 13, 1966, Ser. No. 557,233
1 Claim. (Cl. 280—104.5)

This invention relates to vehicle suspension means, and it has particular reference to an improved structure for a wheeled truck having a pair of axles arranged in tandem relation to each other, each of said axles having at least one pair of wheels thereon, whereby the frame of a vehicle is adapted to be supported at one of its ends.

In one application thereof the invention advantageously may be employed in, but is not necessarily limited to, a trailer vehicle, specifically a dump trailer, having a wheeled truck as described whereby it is supported, rearwardly thereof, and having a dump body on the frame movable pivotally therewith about a transverse axis to and from a tilted position, for unloading, in which the body is inclined forwardly and upwardly.

In accordance with the usual practice a vehicle as described may have a third axle, intermediate the axles of said pair, arranged transversely of the frame and movable pivotally therewith, and the truck may have a pair of leaf springs on opposite sides thereof each supported at its ends on the axles of said pair, and may have bearings on said springs intermediate their ends for engagement by the ends of said third axle whereby the frame is supported on the truck for pivotal adjustment relative thereto.

In a wheeled truck as described it is important to maintain the axles of said pair in parallel relation to each other, perpendicular to the longitudinal axis of the vehicle, so that the wheels will be in alignment with each other. The slightest deviation may result in excessive tire wear.

A prime object of the invention is that of providing an improved structure for a wheel truck as described which includes, in combination with a pair of clamps whereby said bearings advantageously may be connected to the top sides of said springs, intermediate their ends, two pairs of rigid elongated links which are pivotally connected at their ends to said clamps below the springs, and to the axles of said pair, respectively, whereby the axles of said pair are maintained in parallel relation to each other at all times, while at the same time permitting normal movement of the springs.

A further object of the invention resides in the provision of an improved structure as described in which said links comprise turnbuckles, whereby they are readily adjustable in use.

Another object of the invention is to provide an improved structure as described in which the ends of said springs are connected to the axles of said pair for free sliding adjustment of the several leaves of each spring in a longitudinal direction relative to each other, in response to normal movement of the springs.

While the foregoing objects are paramount, other and lesser objects will become apparent as the description proceeds, when considered in connection with the appended drawings wherein.

Figure 1:
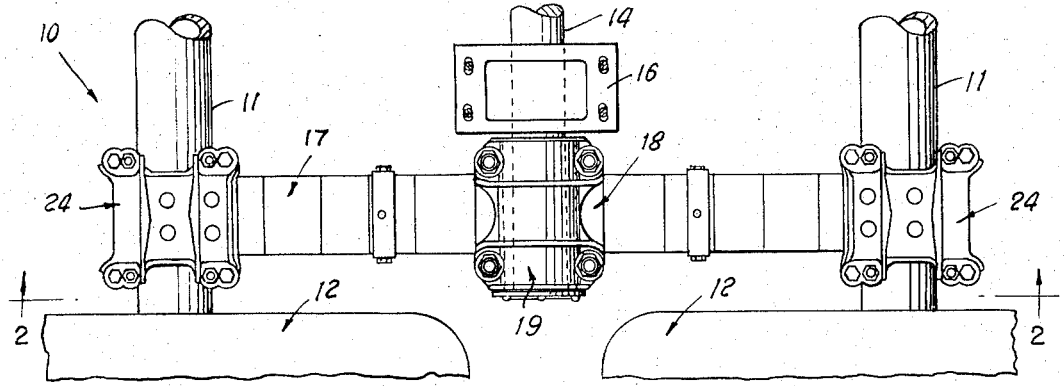
FIGURE 1 is a fragmentary sectional plan view, taken on the line 1—1 of FIGURE 2, showing an improved structure for a wheeled truck as above described embodying the invention.
Figure 2:
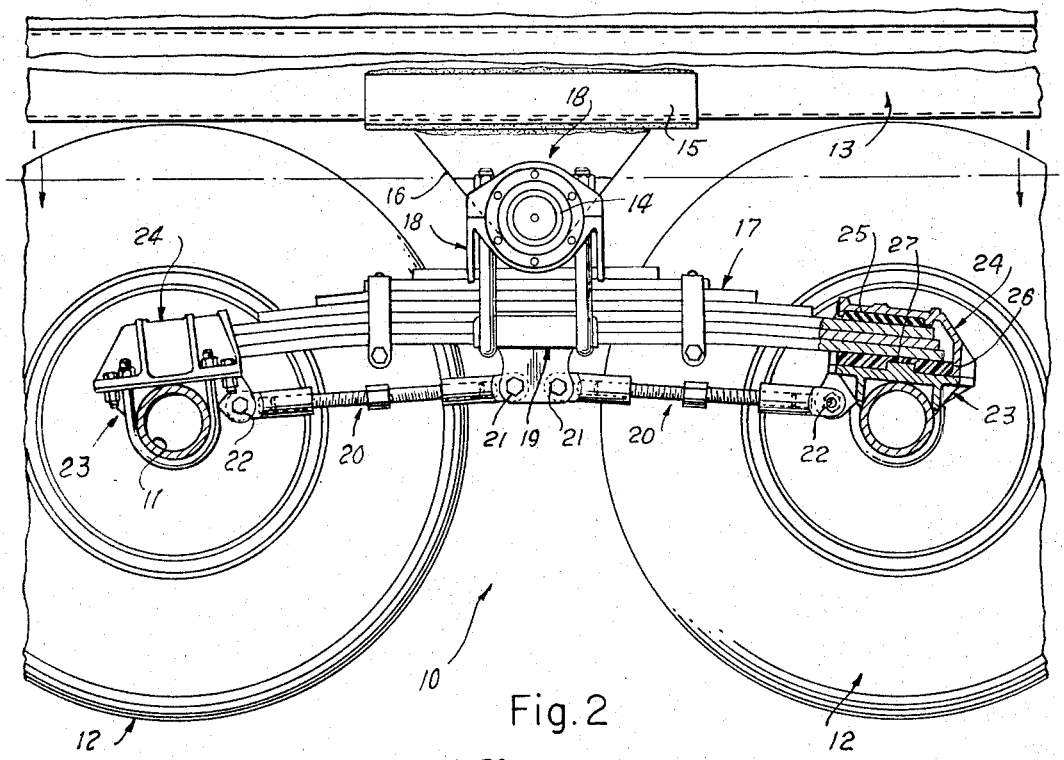
FIGURE 2 is a fragmentary sectional elevational view, taken on the line 2—2 of FIGURE 1, partly broken away to show details of construction.
Figure 3:
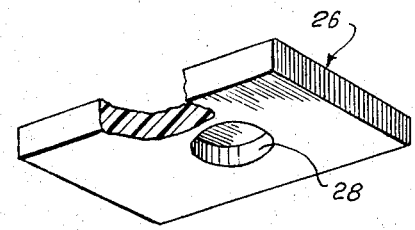
FIGURE 3 is a perspective view on an enlarged scale, partly broken away, of one of the parts.

Referring to FIGURES 1 to 3 of the drawing, the invention is designed for application to conventional vehicles, and the numeral 10 in the drawing designates generally a conventional wheeled truck having a pair of axles 11 arranged in tandem relation to each other. Each of the axles 11 has at least one pair of wheels 12 thereon, two of the wheels 12 being shown. The frame of a vehicle, shown fragmentarily in FIGURE 2 and indicated by the numeral 13, is supported near one of its ends on the wheeled truck 10 as hereinafter described.

A third axle, indicated by the numeral 14, which is positioned intermediate the axles 11 of said pair, is arranged transversely of the frame 13 and below it, and is movable pivotally therewith as hereinafter described.

The frame 13 is supported on the third axle 14 by a pair of stools 15 on opposite sides of the vehicle, one of which is shown, which are rigidly connected to the under side of the frame 13 and depend from it, and by a pair of upstanding brackets or platforms 16 which are rigidly and removably connected to the third axle 14, in spaced apart relation to each other, and form downward extensions of the stools 15, to which they are removably connected, respectively.

A pair of leaf springs 17, which are positioned on opposite sides of the wheeled truck 10, are each supported at its ends on the axles 11 of said pair. The springs 17 are bowed upwardly intermediate their ends and have bearings 18 on the top sides thereof intermediate their ends for engagement by the ends of the third axle 14 whereby the frame 13 is supported on the wheeled truck 10 for pivotable adjustment relative thereto.

In accordance with this invention a pair of clamps 19, whereby the bearings 18 are connected to the top sides of the springs 17, intermediate their ends, have two pairs of turnbuckles 20 pivotally connected thereto at one end, respectively, as at 21. The ends of the turnbuckles 20 opposite the clamps 19 are pivotally connected to the axles 11 of said pair, respectively, as hereinafter described. Each of the turnbuckles 20 is pivotally connected, as at 22, to a corresponding fitting 23, which in turn is clamped to one of the axles 11 of said pair.

Two pairs of box enclosures 24, one of which is removably connected to the top side of each of the fittings 23, and which are open at one end, each have an end portion of one of the springs 17 received therein and provide detent means therefor while at the same time permitting free sliding adjustment of the several leaves of the springs 17 relative to each other in response to normal movement of the springs 17.

A first resilient pad 25 and a second resilient pad 26 are disposed above and below the respective end portions of the springs 17, between the springs 17 and the top of the box enclosures 24, and between the springs 17 and the top sides of the fittings 23, respectively.

Each of the fittings 23 has an upstanding circular boss 27 on the top side thereof for engagement with a corresponding depression 28 in the under side of the corresponding pad 26, shown in FIGURE 3, to prevent displacement of the pad 26.

Figure 4:
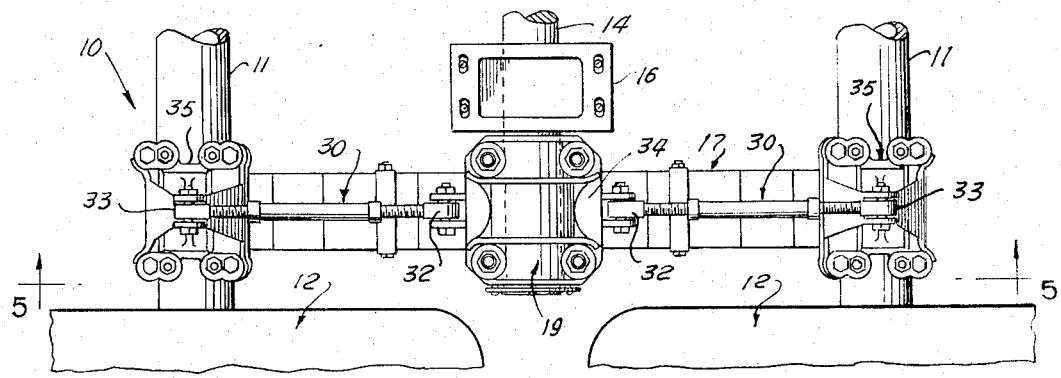
FIGURE 4 is a fragmentary plan view, similar to FIGURE 1, showing a modified form of the invention.
Figure 5:
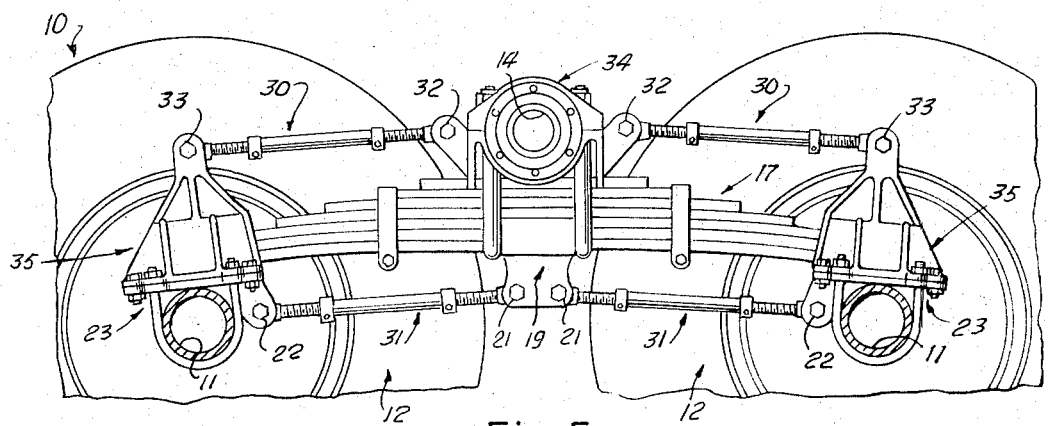
FIGURE 5 is a fragmentary sectional elevational view taken on the line 5—5 of FIGURE 4.

FIGURES 4 and 5 show a modified arrangement in which two apirs of turnbuckles 30, which are in addition to turnbuckles 31, which correspond to the turnbuckles 20 shown in FIGURE 2, are pivotally connected at their ends, at as 32 and 33, to the opposing arrangement of ears on the bearings 34, which latter correspond to the bearings 18 shown in FIGURES 1 and 2, and to upward extensions of the box enclosures 35 for the ends of the springs 17, which correspond to the box enclosures 24.

Figure 6:
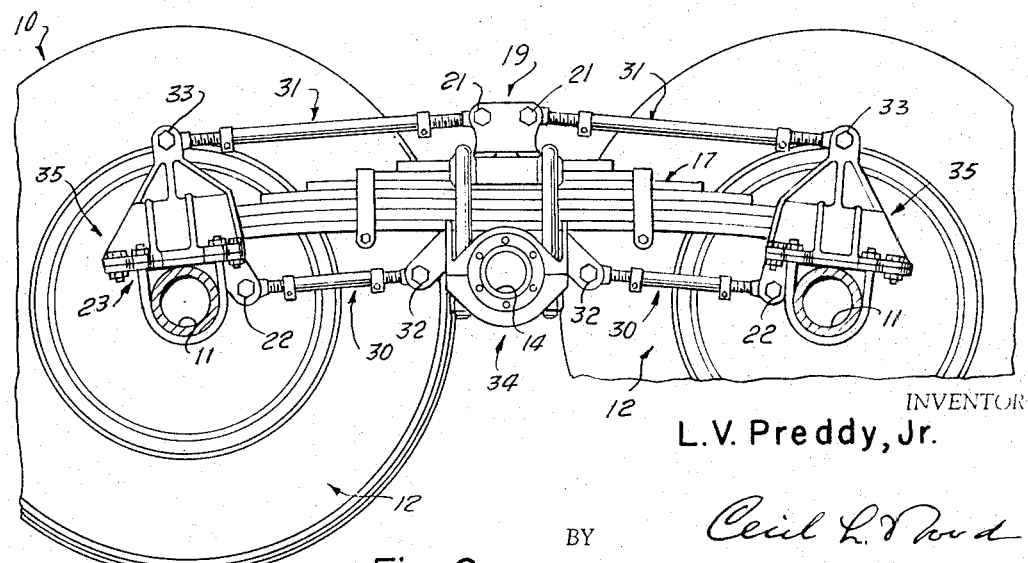
FIGURES 6 to 14 are views similar to FIGURES 2 and 5 each showing a different form of the invention.

FIGURE 6 shows an arrangement similar to that shown in FIGURES 4 and 5 in which the relative positions of the bearings 34 and the clamps 19 are reversed and the ends of the third axle 14 are positioned below the springs 17.

Figure 7:
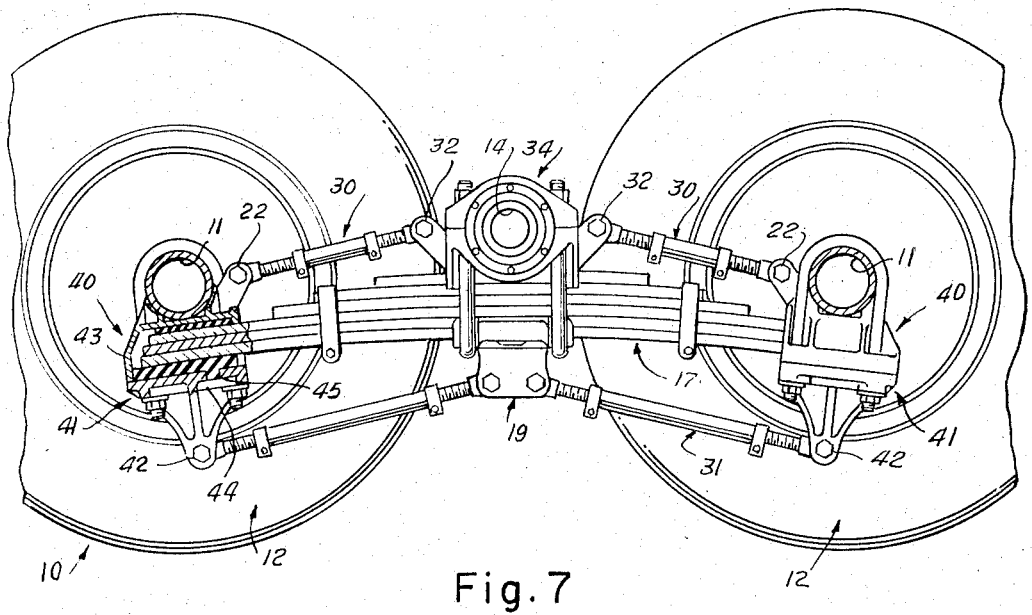
Figure 8:
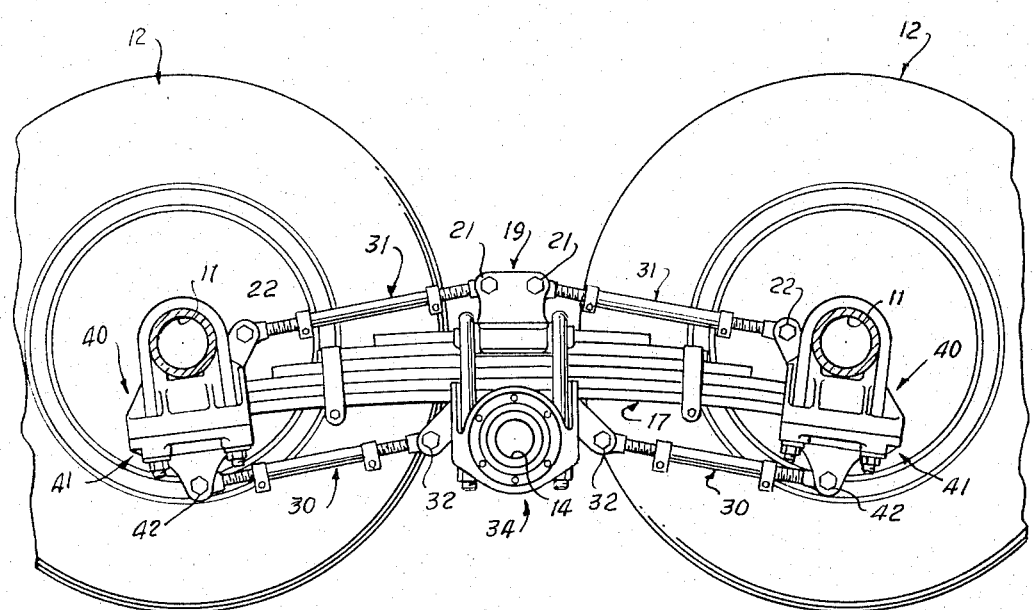

The FIGURES 7 and 8 show arrangements similar to those shown in FIGURES 5 and 6, respectively, in which opposite end portions of the springs 17 are connected to the under sides of the respective axles 11.

Fittings 40 which, with the closure members 41, correspond to the fittings 23 and the box enclosures 24, shown in FIGURE 2, have features of the latter enclosures incorporated in said fittings, and the closure members 41 have depending portions which are pivotally connected, as at 42, to the turnbuckles 31 and 30, respectively.

The cushion members 43, which correspond to the elements 26 shown in FIGURE 2, have bosses 44 on their under sides for engagement with corresponding depressions 45 in the closure members 41.

Figure 9:
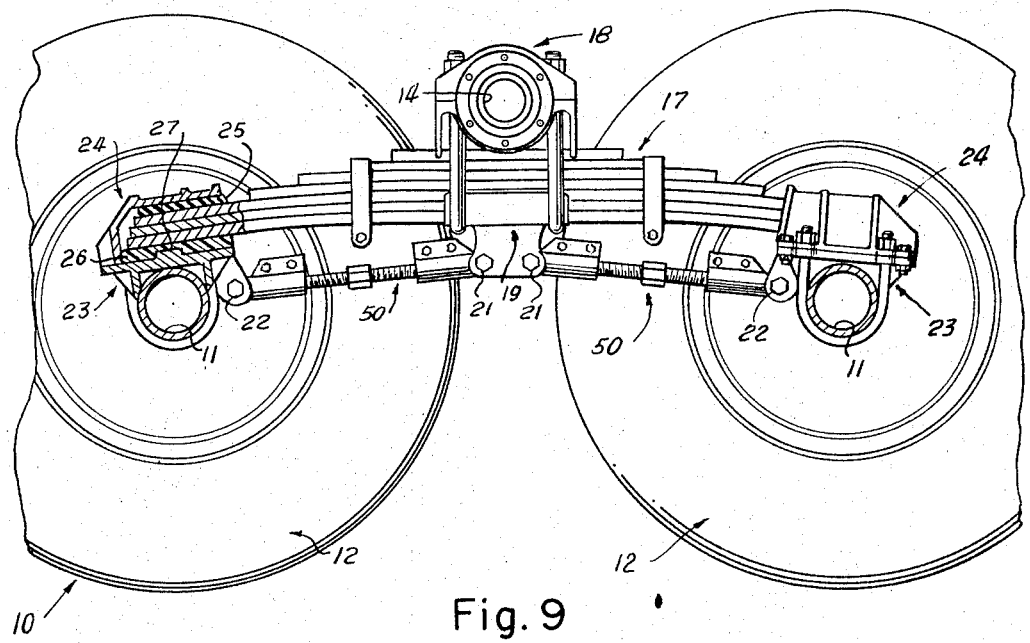

FIGURE 9 shows an arrangement similar to that of FIGURE 2 in which turnbuckles 50, which correspond to the turnbuckles 20, are of somewhat different design.

Figure 10:
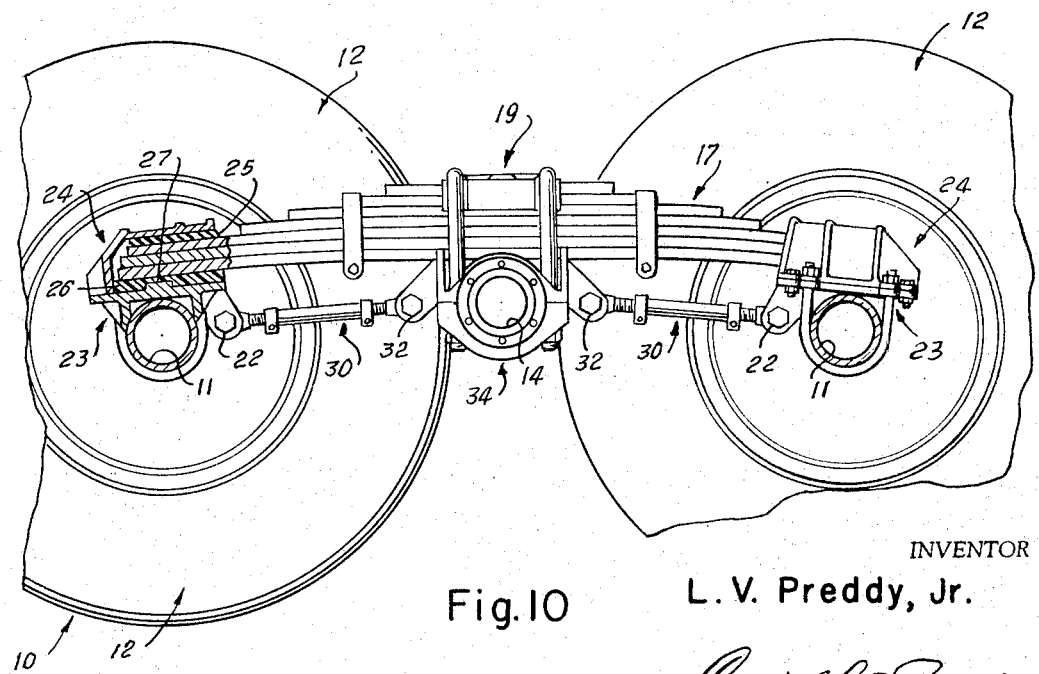

FIGURE 10 shows an arrangement similar to that of FIGURE 6 in which the uppermost turnbuckles 31 are omitted.

Figure 11:
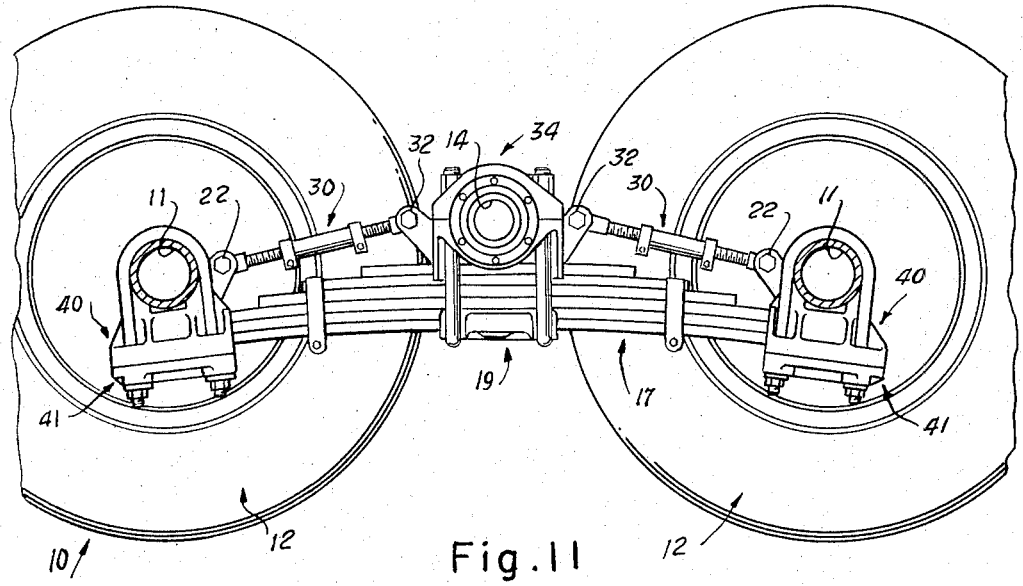
Figure 12:
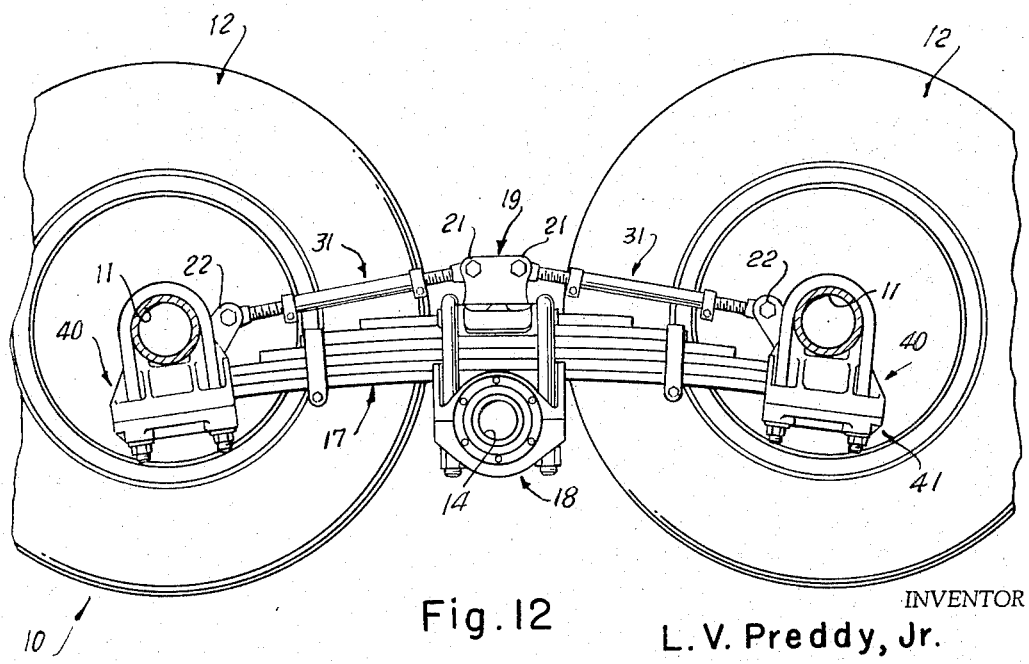

FIGURES 11 and 12 show arrangement similar to those of FIGURES 7 and 8 in which the lowermost turnbuckles 31 and 30 are omitted.

Figure 13:
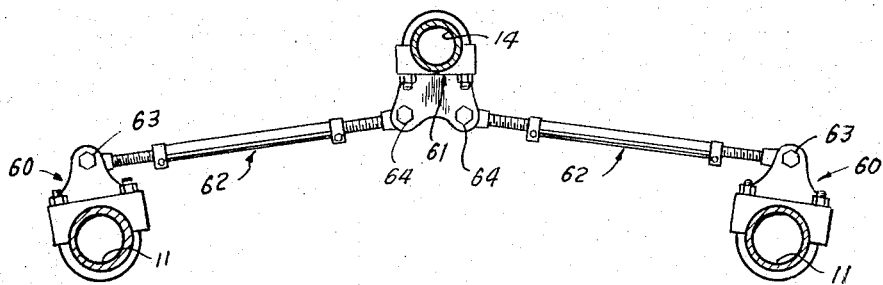
Figure 14:
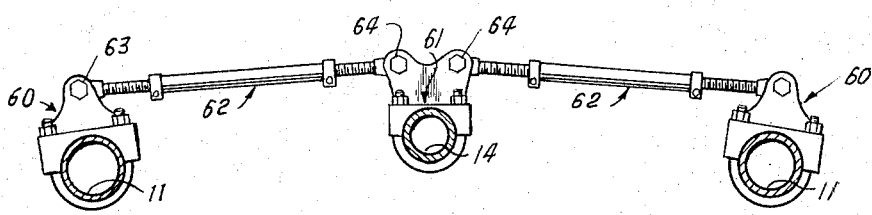

FIGURES 13 and 14 show variations of the arrangement shown in FIGURES 1 to 3 in which the axles 11 and the third axle 14 are connected intermediate their ends, independently of the springs 17, by a pair of clamps 60 connected to the respective axles 11 and a clamp 61 connected to the third axle 14, and a pair of turnbuckles 62 which are pivotally connected at their ends, as at 63 and 64, to the clamps 60 and 61, respectively.

Figure 15:
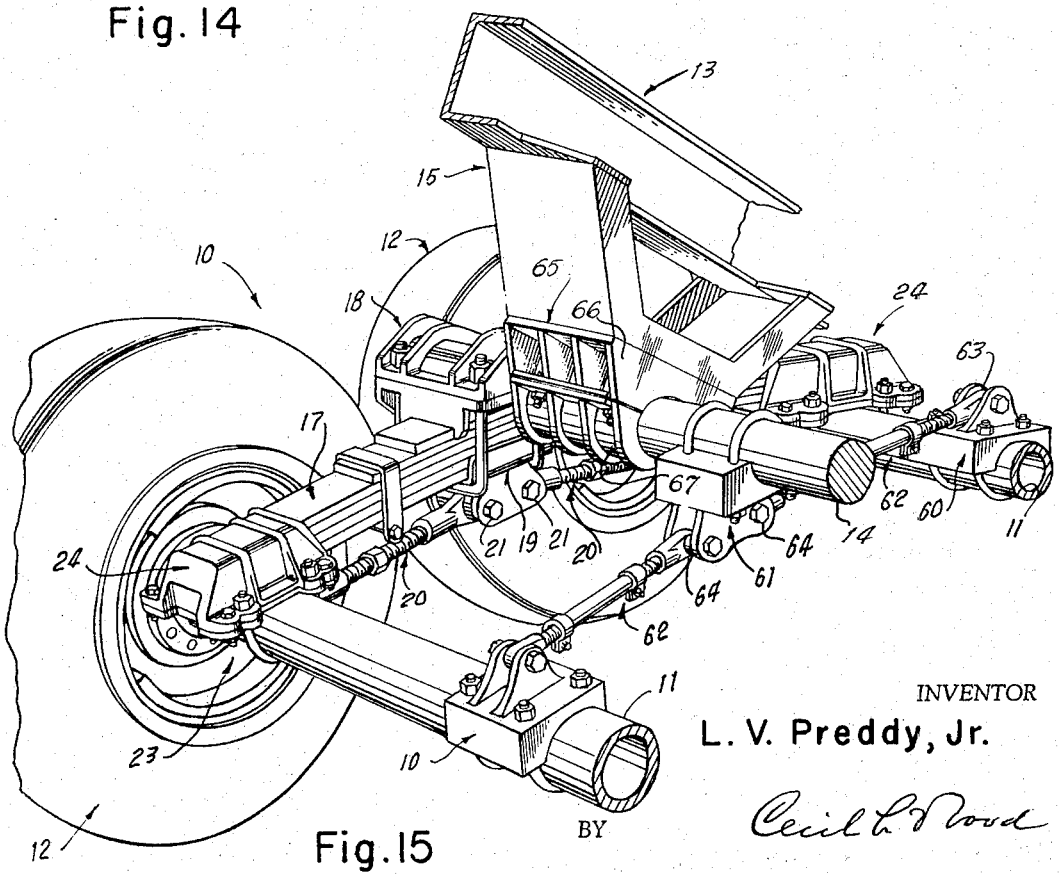
FIGURE 15 is a fragmentary perspective view showing the invention as illustrated in FIGURES 1 to 3, and also as shown in FIGURE 13, as applied to a dump vehicle, and fragmentarily showing a frame element of the dump body in its inclined position preparatory to unloading the vehicle.

The structure illustrated in FIGURE 15 is similar to the axle assembly shown in FIGURES 2 and 9, with the brackets 19 and the turnbuckles 20. The assembly shown in FIGURE 13 is embodied in this structure whereby the upper set of turnbuckles 62 are employed with the clamp assembly 61. In FIGURE 15 the truck frame 13 is pivotally attached to the third axle or trunnion 14 by bearing assemblies 65 comprising upper and lower sections 66 and 67 secured to the underside of the stools 15. In this arrangement the third axle 14 is fixed or rigid within the members 18, and by the clamps 61, while the bearing assemblies 65 are free to rotate on the axle 14.

The invention may be modified within certain limitations, by persons skilled in the art, without departing from the spirit and intent thereof or the scope of the appended claim.

What is claimed is:

1. In combination with a wheeled truck having a pair of axles arranged in tandem relation to each other, each of said axles having at least one pair of wheels thereon whereby the frame of a vehicle is adapted to be supported at one of its ends, said truck having a pair of leaf springs on opposite sides thereof each supported at its ends on the axles of said pair, and having a third, load carrying axle journaled at its ends in bearings therefor on said springs, intermediate their ends, the combination of a pair of clamping elements coacting with said bearings to secure them to said springs, and positioned on the opposite side of said springs from said bearings, two pairs of longitudinally adjustable links, each pivotally connected at its ends to one of said bearings and to one of the axles of said pair, and two other pairs of longitudinally adjustable links, each pivotally connected at its ends to one of said clamping elements and to one of the axles of said pair whereby the axles of said pair are positively maintained in parallel relation to each other at all times, while at the same time permitting normal movement of said springs, and means connecting the ends of said springs to the axles of said pair for free sliding adjustment of the several leaves of each spring in a longitudinal direction relative to each other, in response to normal movement of the springs, said last mentioned means comprising a housing on one of the axles of said pair having an adjacent end portion of one of the springs received therein, and having resilient pads therein above and below the springs.

References Cited

UNITED STATES PATENTS

| | | | |
|---|---|---|---|
| 2,951,709 | 9/1960 | Ward | 280—104.5 |
| 2,096,530 | 10/1937 | Alden | 280—104.5 |
| 1,928,860 | 10/1933 | Marcum | 280—104.5 |
| 1,771,488 | 7/1930 | Duesler | 280—104.5 |

LEO FRIAGLIA, *Primary Examiner.*

P. GOODMAN, *Assistant Examiner.*